(12) United States Patent
Choi et al.

(10) Patent No.: US 12,704,595 B2
(45) Date of Patent: Aug. 11, 2026

(54) METHOD AND APPARATUS WITH NEURAL NETWORK TRAINING

(71) Applicant: SAMSUNG ELECTRONICS CO., LTD., Suwon-si (KR)

(72) Inventors: Sungdo Choi, Suwon-si (KR); Jong-Sok Kim, Suwon-si (KR); Seung Tae Khang, Suwon-si (KR); Jinyong Jeon, Suwon-si (KR); Young Rae Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 423 days.

(21) Appl. No.: 18/297,767

(22) Filed: Apr. 10, 2023

(65) Prior Publication Data

US 2024/0142575 A1 May 2, 2024

(30) Foreign Application Priority Data

Oct. 28, 2022 (KR) ........................ 10-2022-0141373

(51) Int. Cl.
*G01S 7/41* (2006.01)
*G01S 7/35* (2006.01)
(Continued)

(52) U.S. Cl.
CPC .............. *G01S 7/417* (2013.01); *G01S 7/356* (2021.05); *G01S 7/412* (2013.01); *G01S 13/584* (2013.01); *G01S 13/723* (2013.01); *G01S 13/89* (2013.01)

(58) Field of Classification Search
CPC .......... G01S 7/417; G01S 7/356; G01S 7/412; G01S 13/584; G01S 13/89; G01S 13/723;
(Continued)

(56) References Cited

U.S. PATENT DOCUMENTS 11,023,730 B1 * 6/2021 Zhou .................... G06V 10/764
11,816,185 B1 * 11/2023 Roth ........................ G06N 3/08
(Continued)

FOREIGN PATENT DOCUMENTS

KR 10-2022-0088059 A 6/2022
WO WO 2022/107595 A1 5/2022

OTHER PUBLICATIONS

Scheiner, Nicolas, et al. "Object detection for automotive radar point clouds—a comparison." *AI Perspectives* vol. 3. Issue 1 (2021). pp. 1-23.

*Primary Examiner* — Resha Desai
*Assistant Examiner* — Peter Davon Doze
(74) *Attorney, Agent, or Firm* — NSIP Law

(57) ABSTRACT

A method including clustering second point clouds comprised in second point cloud data of a second timepoint, obtaining output data corresponding to one or more second clusters generated as a result of the clustering by applying the second point clouds to a pretrained neural network, determining whether at least one of the one or more second clusters is a target object based on a reliability factor, tracking first clusters corresponding to the target object in first point cloud data of one or more first timepoints prior to the second timepoint, and training of the pretrained neural network based on the output data corresponding to the first clusters and the first point clouds for each first cluster determined according to a result of the tracking.

17 Claims, 7 Drawing Sheets

(51) Int. Cl.

| | |
|---|---|
| ***G01S 13/58*** | (2006.01) |
| ***G01S 13/72*** | (2006.01) |
| ***G01S 13/89*** | (2006.01) |

(58) Field of Classification Search

CPC ...... G01S 17/931; G01S 13/865; G01S 17/66; G01S 13/505; G06T 2207/10028; G06T 2207/20081; G06T 2207/20084

See application file for complete search history.

(56) References Cited

U.S. PATENT DOCUMENTS

| | | | | |
|---|---|---|---|---|
| 2019/0363430 | A1* | 11/2019 | Wang | G01S 13/931 |
| 2021/0043002 | A1* | 2/2021 | Zeng | G06T 7/74 |
| 2021/0256387 | A1 | 8/2021 | Chopra et al. | |
| 2022/0207822 | A1 | 6/2022 | Botonjic et al. | |
| 2022/0324472 | A1* | 10/2022 | Kashu | B60W 60/005 |
| 2023/0004797 | A1* | 1/2023 | Chiu | G06N 3/08 |
| 2023/0042750 | A1* | 2/2023 | Kumar | G06N 3/045 |
| 2024/0104879 | A1* | 3/2024 | Jiang | G06V 10/245 |
| 2024/0111051 | A1* | 4/2024 | Gupta | G06V 20/52 |
| 2024/0125923 | A1 | 4/2024 | Kim et al. | |

* cited by examiner

METHOD AND APPARATUS WITH NEURAL NETWORK TRAINING

CROSS-REFERENCE TO RELATED APPLICATIONS

This application claims the benefit under 35 USC § 119(a) of Korean Patent Application No. 10-2022-0141373, filed on Oct. 28, 2022, in the Korean Intellectual Property Office, the entire disclosure of which is incorporated herein by reference for all purposes.

BACKGROUND

1. Field

The following description relates to a method and apparatus with neural network training.

2. Description of Related Art

Typically, advanced driver-assistance systems (ADAS) are systems that support driving to improve a driver's safety and convenience and to avoid dangerous situations by using sensors mounted inside or outside of the vehicle.

Typically, the ADAS may employ sensors that include, for example, cameras, infrared sensors, ultrasonic sensors, Light Detection and Ranging (LiDAR) sensors, and radars, for example. Compared to the other sensor options, a radar may be capable of stably measuring an object in a vicinity of a vehicle regardless of a surrounding environment, such as the weather.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, here is provided a processor implemented method including clustering second point clouds comprised in second point cloud data of a second timepoint, obtaining output data corresponding to one or more second clusters generated as a result of the clustering by applying the second point clouds to a pretrained neural network, setting, dependent on whether a reliability factor corresponding to the output data satisfying a predetermined criterion, at least one or more second clusters to be a target object, tracking first clusters corresponding to the target object in first point cloud data of one or more first timepoints, the first timepoints being timepoints prior to the second timepoint, and training of the pretrained neural network based on the output data corresponding to the first clusters and the first point cloud data for each first cluster determined according to a result of the tracking.

The first point cloud data and second point cloud data may respectively include data generated based on radar data received from a radar device attached to a driving vehicle.

The first point cloud data and second point cloud data may respectively include data generated by transforming one of a three-dimensional (3D) first coordinate system or a four-dimensional (4D) first coordinate system, having a range, a velocity, and an angle of arrival as axes, into a second coordinate system.

The first coordinate system may include a coordinate system generated based on at least one of the range obtained from radar data through a range Fast Fourier Transform (FFT), the velocity obtained from the radar data through a Doppler FFT, and the angle of arrival obtained from the radar data.

The first point cloud data and second point cloud data may respectively include data expressed in a three-dimensional (3D) second coordinate system or a four-dimensional (4D) second coordinate system comprising two or three axes indicating a position and one axis indicating a velocity, and the second coordinate system may include an absolute coordinate system capable of displaying a position of a driving vehicle and a position of an object. The clustering of the second point clouds may include clustering the second point clouds based on a density degree of the second point clouds in the second point cloud data.

The pretrained neural network may be trained to recognize at least one target object positioned within a predetermined range from a driving vehicle, and data input to the pretrained neural network may include the point clouds.

The pretrained neural network may include at least one of a first neural network pretrained based on radar data and a second neural network pretrained based on at least one of Light Detection and Ranging (LiDAR) data or third sensor data.

The output data may include at least one of a type, a position, a size, and a movement direction of an object corresponding to each of the first clusters.

The reliability factor may be determined based on at least one of a determined uncertainty score and a determined confidence score.

The setting of the one or more second clusters as the target object may include, based on the determined uncertainty score of the output data corresponding to the at least one of the one or more second clusters being less than or equal to a predetermined first criterion, assigning a respective cluster to be the target object based on the determined uncertainty score and based on the determined confidence score of the output data corresponding to the cluster being greater than or equal to a predetermined second criterion, assigning the respective cluster to be the target object based on the determined confidence score.

The tracking of the first clusters may include tracking a target cluster corresponding to the target object in a second coordinate system based on information about a vehicle to which a radar device is attached.

The tracking of the first clusters may include tracking a target cluster corresponding to the target object on a premise that the target object is fixed in a second coordinate system.

The tracking of the first clusters may include tracking a target cluster corresponding to the target object based on a comparison between state information corresponding to the second cluster, the state information being predicted based on state information corresponding to the target cluster in the point cloud data of the first timepoints, and state information corresponding to the second cluster in the second point cloud data.

The tracking of the first clusters may include storing point clouds corresponding to a target cluster corresponding to the target object in the first point cloud data of each of the one or more first timepoints.

The training of the pretrained neural network may include training the pretrained neural network based on training data including ground truth data and respective one or more point clouds for target clusters corresponding to target objects of the one or more first timepoints targets comprise training input data.

The one or more first timepoints may include plural timepoints and the first point cloud data may include data obtained by merging first point clouds for each first cluster into one time unit.

In a general aspect, here is provided a non-transitory computer-readable storage medium storing instructions that, when executed by a processor of an electronic device that includes a radar or of a server, cause the processor to perform the processor implemented method.

In a general aspect, here is an electronic device including at least one processor and a radar, the processor is configured to cluster second point clouds comprised in second point cloud data of a second timepoint, obtain output data corresponding to one or more second clusters generated as a result of the clustering by applying the second point clouds to a pretrained neural network, set one or more of the second clusters as a target object based on whether a reliability factor corresponding to the output data satisfies a predetermined criterion, track a first cluster corresponding to the target object in respective first point cloud data of one or more first timepoints, the first timepoints being one or more timepoints prior to the second timepoint, and train the pretrained neural network based on the output data corresponding to the first cluster and first point clouds for each first cluster determined according to a result of the tracking.

In a general aspect, here is provided a server including a processor configured to execute a plurality of instructions and a memory storing the plurality of instructions, wherein execution of the plurality of instructions configures the processor to be configured to cluster second point clouds comprised in second point cloud data of a second timepoint, obtain output data corresponding to one or more second clusters generated as a result of the clustering by applying the second point clouds to the pretrained neural network, set at least one of the one or more second clusters to be a target object based on whether a reliability factor corresponding to the output data satisfies a predetermined criterion, track a first cluster corresponding to the target object in first point cloud data of one or more first timepoints, the first timepoints being timepoints prior to the second timepoint, and train the pretrained neural network based on the output data corresponding to the second cluster and first point clouds for each first cluster determined according to a result of the tracking.

In a general aspect, here is provided a device including a processor configured to execute a plurality of instructions and a memory storing the plurality of instructions, wherein execution of the plurality of instructions configures the processor to be configured to detect, at a second time point, a target object among second point cloud data according to a density degree of second point clouds in the second point cloud data, classify the target object into a type of object, and track the target object among first point clouds in first point cloud data from a plurality of previous timepoints.

The classifying may include applying a target point cloud of the second point cloud comprising the target object to a trained neural network.

The processor may be further configured to calculate an angle or arrival of the target object, generate a first coordinate system based on the angle of arrival, a distance of the target object, and a velocity of the target object, and generate a second coordinate system from the first coordinate system based a position of the device and the target object as an absolute coordinate system.

The processor may be further configured to generate a safe driving path for the device based on the second coordinate system and the type of object for the target object.

The device may be a vehicle.

The detecting may include assigning a confidence score to a cluster of second point clouds and assigning a respective cluster as the target object responsive to the confidence score being greater than or equal to a criterion.

Other features and aspects will be apparent from the following detailed description, the drawings, and the claims.

Figure 1:
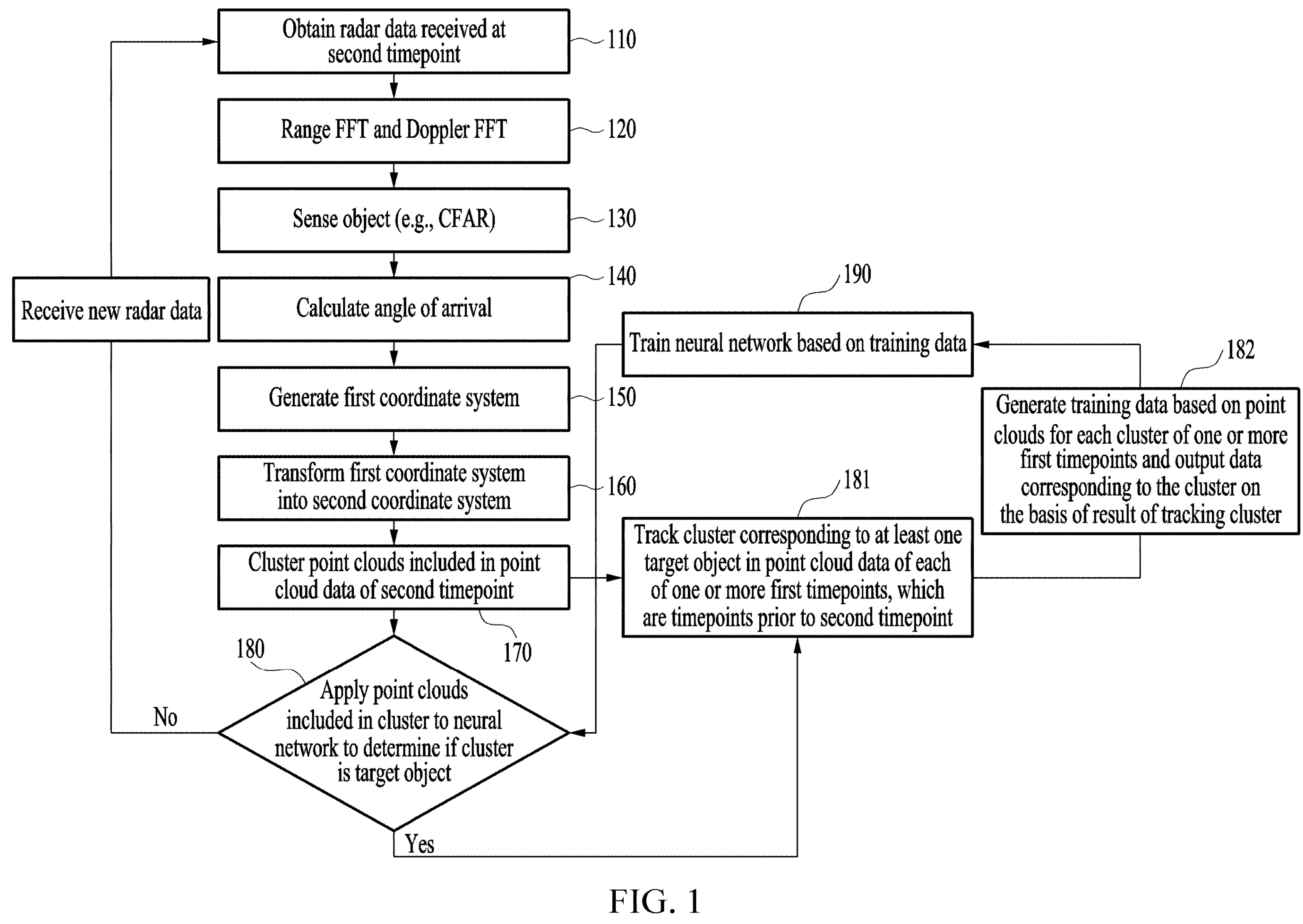
FIG. 1 illustrates an example of a training method of a neural network according to one or more embodiments.

Throughout the drawings and the detailed description, unless otherwise described or provided, the same drawing reference numerals may be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Due to manufacturing techniques and/or tolerances, variations of the shapes shown in the drawings may occur. Thus, the examples described herein are not limited to the specific shapes shown in the drawings, but include changes in shape that occur during manufacturing.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein.

An electronic device may use a radar device attached to a driving vehicle to recognize objects (e.g., surrounding vehicles, obstacles, terrain, and the like) around the driving vehicle. In order to recognize the objects, the electronic device may transform radar data into point cloud data. However, point cloud data that is based on radar data may have a lower point cloud density than point cloud data based on Light Detection and Ranging (LiDAR) data. In some examples, labeling, based on the lower point cloud density, in order to generate ground truth data for supervised training of a neural network may be time consuming with a lower accuracy. Therefore, in order to generate the ground truth data, labeling may be performed by using point cloud data based on the LiDAR data. For example, labeling may be performed on the point cloud data based on the radar data, with reference to the point cloud data that is based on the LiDAR data. However, there may be limits to the measurable range of LiDAR data. For example, LiDAR data may indicate a high accuracy in recognizing an object that is within 100 meters (m) from a driving vehicle, for example, but it may have a low accuracy in recognizing an object that is at a longer range of 100 m or more from the driving vehicle. Accordingly, the electronic device may use radar data to recognize an object positioned at a long range through a neural network. Furthermore, the electronic device may retrain the neural network using radar data capable of recognizing a long range object, so that the neural network may recognize the object positioned at a long range from the driving vehicle.

FIG. 1 illustrates an example of a training method of a neural network according to one or more embodiments.

Referring to FIG. 1, a method may include utilizing output data of a neural network with a high reliability as ground truth data (e.g., pseudo label data) and using data with a low reliability, or low reliability data, (e.g., an object far from a vehicle or old past data) for retraining the neural network. The output data of the neural network may be output data corresponding to an object that is adjacent to a driving vehicle. The smaller the range between an object and a driving vehicle, that is how close the object is to the vehicle, the greater the reliability of the information about the object may be output by the neural network. Conversely, the greater the range between the object and the driving vehicle, the information about the object output by the neural network may be less reliable. Therefore, the low reliability data may be output data corresponding to an object far from the driving vehicle or point cloud data of the object.

In operation 110, a processor, such as processor 710 of FIG. 7 discussed below as a non-limiting example, may obtain radar data received at a second timepoint. For example, the second timepoint may be a timepoint when a server (or an electronic device attached to a vehicle) receives the radar data. The radar data may be obtained from a radar device. A first timepoint and the second timepoint may be terms that distinguish a past timepoint from a present timepoint but the present disclosure may not be limited thereto. The radar data is described below in greater detail with reference to FIG. 2. For example, the radar data may be an intermediate frequency (IF) signal. The IF signal may have a frequency corresponding to a difference between the frequency of a radar transmission signal and the frequency of a radar reception signal. The processor 710 may perform a sampling operation on the IF signal and generate radar data through a sampling result.

Referring to FIG. 1, in operation 120, the processor 710 according to an example may perform at least one of a range Fast Fourier Transform (FFT) and a Doppler FFT based on the radar data. Through the operation, the processor 710 may obtain a range to a point cloud (e.g., a relative range) based on the driving vehicle and the velocity (e.g., a relative velocity or a radial velocity) of the point cloud.

The processor 710 according to an example may perform the range FFT based on the radar data. As a result of the range FFT, the processor 710 may obtain a range to the point cloud from the driving vehicle.

The processor 710 according to an example may perform the Doppler FFT based on the result of the range FFT. As a result of performing the Doppler FFT, the processor 710 may obtain the velocity (e.g., a relative velocity or a radial velocity) of the point cloud based on the driving vehicle.

In operation 130, the processor 710 according to an example may detect an object, based on the result of processing the range FFT and the Doppler FFT on the radar data. For example, the processor 710 may detect the object through Constant False Alarm Rate (CFAR) detection. The CFAR may be a thresholding-based detection method.

In operation 140, the processor 710 according to an example may calculate an angle of arrival. In addition to the object's range information (e.g., a vehicle, a person, a guardrail, a traffic light, and the like), in a real-world driving scenario of a vehicle on a road, there may also be a desire for information about the angle of arrival of the object. The processor 710 according to an example may estimate the angle of arrival based on the result of operation 130. To estimate the angle of arrival, a plurality of transmission and reception antennas may be configured in an array form and a Digital Beam Forming (DBF) algorithm or an Angle of Arrival (AoA) MULtiple Signal Classification (MUSIC) algorithm may be used, thus identifying in a direction of the object from the driving direction of the vehicle. The DBF algorithm may be an algorithm for obtaining angular information of an unknown target. The MUSIC algorithm may be an algorithm for estimating the angle of arrival of a signal through eigen value decomposition, using the property that a signal subspace crosses a noise subspace at right angles.

Through operations 120 to 140, the processor 710 may perform the range FFT on the radar data and then the Doppler FFT on the result of performing the range FFT. The processor 710 may identify a cut-in object through CFAR. In addition, the processor 710 may estimate the angle of arrival, e.g., an AoA, of each point cloud.

In operation 150, the processor 710 according to an example may generate a first coordinate system using the range, the velocity, and the angle of arrival obtained through operations 120 to 140. For example, the first coordinate system may be a three-dimensional (3D) coordinate system having a range, a velocity, and an angle of arrival as axes. For example, the first coordinate system may be a four-dimensional (4D) coordinate system. The first coordinate system may be a 'relative coordinate system' having, as axes, the range, velocity, and angle of arrival of point clouds determined based on the driving vehicle. The first coordinate system may be a coordinate system generated based on at least one of the range obtained from the radar data through the range FFT, the velocity obtained from the radar data through the Doppler FFT, and the angle of arrival obtained from the radar data. For example, the processor 710 may display the radar data transformed through operations 120 to 140 on the first coordinate system.

Figure 6:
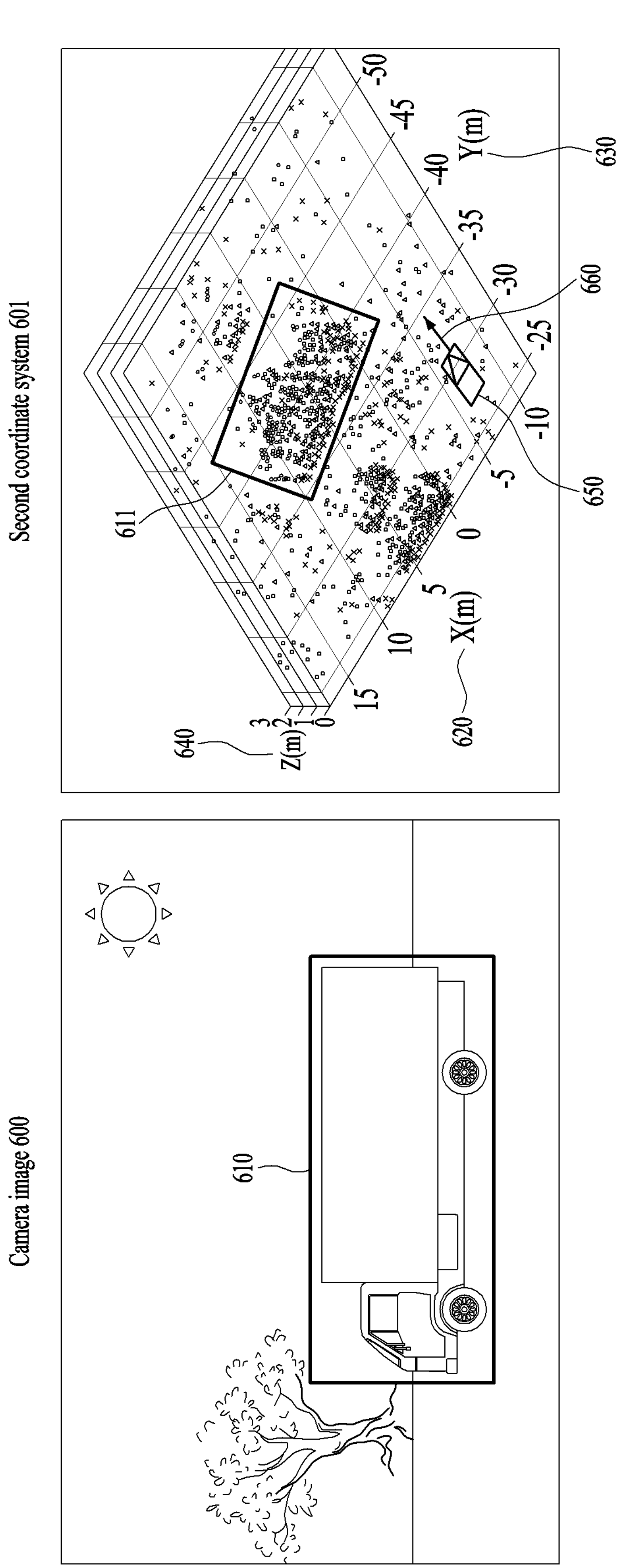
FIG. 6 illustrates an example of a second coordinate system according to one or more embodiments.

In operation 160, the processor 710 according to an example may transform the first coordinate system into a second coordinate system. The processor 710 may transform the first coordinate system, which is the relative coordinate system having the driving vehicle as a reference, into the second coordinate system, which is an absolute coordinate system. The second coordinate system may be a coordinate system capable of displaying the positions of the driving vehicle and the object. The second coordinate system may be a 3D coordinate system (or a 4D coordinate system) including two axes (or three axes) indicating a position and one axis indicating a velocity. For example, an x-axis and a y-axis may indicate a position, and a z-axis may indicate a velocity. In another example, x, y, and z axes may indicate a position, and an r-axis may indicate a velocity. Accordingly, the second coordinate system may be a 3D or 4D coordinate system. The second coordinate system is described below in greater detail with reference to FIG. 6. Referring to FIG. 6, as a result of the transformation, point clouds may be displayed on a second coordinate system 601.

In a non-limiting example, point cloud data may be generated based on radar data received from a radar device attached to the driving vehicle. A point clouds may include a set of points measured on the surface of an object generated by a 3D laser. The processor 710 may process the radar data to generate the point cloud data. By generating the point cloud data based on the radar data, the processor 710 may apply both the radar data and the LiDAR data to a neural network for training. Since the product of LiDAR data is the point cloud data, the processor 710 may unify the form of input data applied to the neural network, so that the neural network may be trained for data obtained from various sensor devices. The point cloud data may be data generated by transforming, into the second coordinate system, the 3D first coordinate system having the range, velocity, and angle of arrival as axes.

In operation 170, the processor 710 according to an example may cluster point clouds included in the point cloud data of a second timepoint. In one example, the processor 710 may cluster point clouds based on the density degree of the point clouds in the point cloud data. In another example, the processor 710 may cluster, into one cluster, a high-density area in which point clouds are densely clustered. For example, when there are n or more point clouds within a predetermined range from a certain point cloud, the processor 710 may cluster the point clouds into one cluster. In another example, different clusters may be determined when different point clouds are detected having a dense cluster within a predetermined range from each other.

As a result of the clustering, at least one cluster may be determined. For example, when there are three objects (e.g., three vehicles) in an area where a radar device acquires radar data, three clusters may be determined from the point cloud data. In this example, each cluster may correspond to an object, or a target object, such as the example three vehicles discussed above. Accordingly, the processor 710 may apply point clouds included in a cluster to the neural network and thus obtain output data corresponding to the cluster. The output data may include at least one of a type, a position, a size, and a movement direction of an object corresponding to each of at least one cluster. The type of the object may refer to the type of an object around a driving vehicle. For example, the type of the object may include a vehicle, a person, a guardrail, a lane, a crosswalk, a traffic light, and the like. The output data may include the probability that a cluster corresponds to the type of an object. The position of the object may be a specific position where the object exists in a coordinate system. For example, the output data may include the probability that an object exists in a specific position. The size of the object may be an estimated size based on the point cloud data. For example, the output data may include the size of an object corresponding to a cluster and the probability that the object corresponding to the cluster has the applicable size. The movement direction may be the movement direction of an object. An object may be stationary or moving. The driving vehicle may recognize a direction in which the object is moving. The direction the driving vehicle is moving may be used to predict the next position of the object. For example, the output data may include the probability that the moving direction of the object is in a specific direction.

In operation 180, the processor 710 according to an example may determine whether a cluster is a target object by applying point clouds included in the cluster to the neural network. In a non-limiting example, the target object may be an element that affects the autonomous driving situation of the driving vehicle. The driving vehicle may determine a safe autonomous driving path by recognizing the target object. Accordingly, the target object may be an object that the processor 710 should recognize as an object in the autonomous driving situation. The processor 710 according to an example may apply the point clouds to a pretrained neural network and thus obtain output data corresponding to at least one cluster generated as a result of the clustering. For example, when one cluster is generated as the result of clustering, the processor 710 may apply the point clouds included in one cluster to the pretrained neural network. When two or more clusters are generated, the processor 710 may apply the point clouds included in each of the two or more clusters to the pretrained neural network.

When an object is determined to not be a target object, the processor 710 may receive new radar data for a next timepoint. The next timepoint may then be considered the second timepoint in operation 110 and the time period considered to be the second timepoint may be referred to as a first timepoint, among other previous first timepoints. When the object is determined to not be a target object, ground truth data used for training the neural network may not be determined. In this case, the processor 710 may not track the cluster but receive new radar data to search for the target object again.

The pretrained neural network according to an example may be a neural network trained to recognize at least one target object positioned within a predetermined range from the driving vehicle. As described above, the closer the range between the driving vehicle and the object, the greater the accuracy in recognizing the object. A range within the predetermined range may be determined based on whether a result of recognizing the object is reliable based on LiDAR data. LiDAR data may have a high reliability in recognizing an object positioned within a certain range. However, LiDAR data may have a low reliability in recognizing an object positioned at a longer distance or range. Accordingly, the processor 710 may generate training data corresponding to an object at a close range based on the high accuracy by using the LiDAR data. Accordingly, the processor 710 may train the neural network using the training data including the LiDAR data and the ground truth data. The processor 710 may recognize an object at a short range, using the pretrained neural network.

In a non-limiting example, data being input to the pretrained neural network may be point clouds. The point clouds may be at least one of data generated based on the radar data and data generated based on the LiDAR data. Accordingly, the data input to the neural network may be at least one of the radar data and the LiDAR data. When the input data is processed into the form of point cloud data, other sensor data obtained from other sensor devices may also be data that may be input to the neural network. For example, the processor 710 may transform image data obtained from a camera into point cloud data and then apply the point cloud data having the camera data to the neural network.

In a non-limiting example, the pretrained neural network may be a neural network for generating ground truth data (e.g., pseudo label data). Accordingly, the processor 710 may determine the output data of the pretrained neural network as the ground truth data and retrain the pretrained neural network. In order to generate the ground truth data constituting the training data, the processor 710 may use output data of the neural network trained based on the radar data. In a non-limiting example, the processor 710 may use output data of the neural network trained based on LiDAR data. The pretrained neural network may include at least one of a first neural network that is pretrained based on the radar data and a second neural network that is pretrained based on at least one of the LiDAR data and third sensor data. A third sensor may be a sensor other than a LiDAR sensor or a RADAR sensor among the sensors being used for autonomous driving. For example, the third sensor may include at least one of a camera, an infrared sensor, and an ultrasonic sensor. The third sensor may be a name for distinguishing a sensor from the RADAR sensor and the LiDAR sensor, and a first sensor may be named LiDAR and a second sensor may be named RADAR. The first sensor, the second sensor, and the third sensor may be used only as examples, and the present disclosure is not limited thereto. The processor 710 may determine output data of a first neural network as ground truth data. In this case, a cluster including point clouds applied to the first neural network may correspond to a target object. Alternatively, the processor 710 may determine output data of a second neural network as ground truth data. In this case, a cluster including point clouds applied to the second neural network may correspond to a target object.

The processor 710 according to an example may determine at least one cluster among one or more clusters as a target object, based on whether a reliability factor corresponding to the output data satisfies a predetermined criterion. The reliability factor may refer to the accuracy of output data. In some examples, the data may be considered high reliability data because the data's reliability factor is high. The reliability factor may be determined based on at least one of an uncertainty and a confidence score. The predetermined criterion may be determined based on whether output data is reliable enough to be used for training the neural network. For example, the predetermined criterion may be arbitrarily determined by a user or determined by the processor 710 based on training data.

When the uncertainty of output data corresponding to one cluster among the one or more clusters is less than or equal to predetermined first criterion, the processor 710 according to an example may determine that the cluster is a target object. The uncertainty may refer to a distribution arising out of loss of information when a real world is represented in a data sample. The lower the uncertainty, the greater the reliability of the output data. The predetermined first criterion may be a criterion determined by a user or the processor 710. For example, when the predetermined first criterion is a threshold value and the uncertainty is less than or equal to the threshold value, the processor 710 may determine that an applicable cluster is a target object.

When the confidence score of the output data corresponding to a cluster is greater than or equal to a predetermined second criterion, the processor 710 according to an example may determine that the cluster is a target object. The confidence score may be a number between 0 and 1 indicating the probability that the output data of the neural network is accurate. For example, the confidence score may refer to the possibility that an object of interest (e.g., a target object) is included in a box (e.g., a cluster). The greater the confidence score, the greater the reliability of the output data. The predetermined second criterion may be a criterion determined by a user or the processor 710. For example, when the predetermined second criterion is a threshold value and the confidence score is greater than or equal to the threshold value, the processor 710 may determine that an applicable cluster is a target object.

Upon reaching a determination of that an object is a target object, the processor 710 may perform operation 181 with respect to the determined target object. The processor 710 may track a cluster corresponding to at least one target object in the point cloud data of each of one or more first timepoints, the first timepoints being timepoints prior to timepoint termed as the second timepoint. In an example, the first timepoints may be one or more previous timepoints, prior to the detection of the target object. Thus, the one or more first timepoints may be a past timepoint compared to the second timepoint. The processor 710 may track the cluster corresponding to the target object in the point cloud data of each of the one or more first timepoints, so that the point clouds corresponding to the cluster may be identified in the past point cloud data. In addition, the processor 710 may use the identified point clouds as training data to retrain the neural network.

In a non-limiting example, a method of tracking a cluster may assume that objects around a driving vehicle are fixed except for the driving vehicle. The method of tracking a cluster or a method of tracking a cluster without such assumption may also be used.

The processor 710 according to an example may assume that a surrounding object is fixed and may track a cluster in cloud point data of one or more first timepoints. The processor 710 may track the cluster corresponding to a target object based on information about a vehicle with a radar device attached thereto in a second coordinate system. The vehicle equipped with the radar device may be a driving vehicle. Information about the driving vehicle may include at least one of the moving direction, the position, or the velocity of the driving vehicle. The processor 710 may transform the first coordinate system into the second coordinate system, using the information about the driving vehicle. In this case, the processor 710 may represent point clouds in the second coordinate system based on the movement of the driving vehicle. The processor 710 may track the cluster on the assumption that the target object is fixed in the second coordinate system. When the target object is fixed in the second coordinate system, which is an absolute coordinate system, the position coordinates of the target object in the second coordinate system may be fixed. Accordingly, since the position coordinates of the target object are fixed in the absolute coordinate system (e.g., the second coordinate system), the processor 710 may identify the coordinates of the point clouds included in the cluster corresponding to the target object from the point cloud data of the one or more first timepoints and thus track the cluster.

The processor 710 according to an example may track the cluster corresponding to one or more target objects by predicting the movement of the object. The processor 710 may track the cluster based on the comparison between state information corresponding to a cluster of the second timepoint, which is predicted based on state information corresponding to the cluster in the point cloud data of the first timepoint, and state information corresponding to the cluster in the point cloud data of the second timepoint. For example, based on state information (e.g., a position, a velocity, a moving direction, and the like) of a point cloud included in a cluster of the first timepoint, the processor 710 may predict state information of the point cloud of the second timepoint. When the predicted state information is equal to actual state information of the second timepoint, the point cloud may likely be included in the same cluster. Through this principle, the processor 710 may track the cluster in the point cloud data of the first timepoint.

Figure 4:
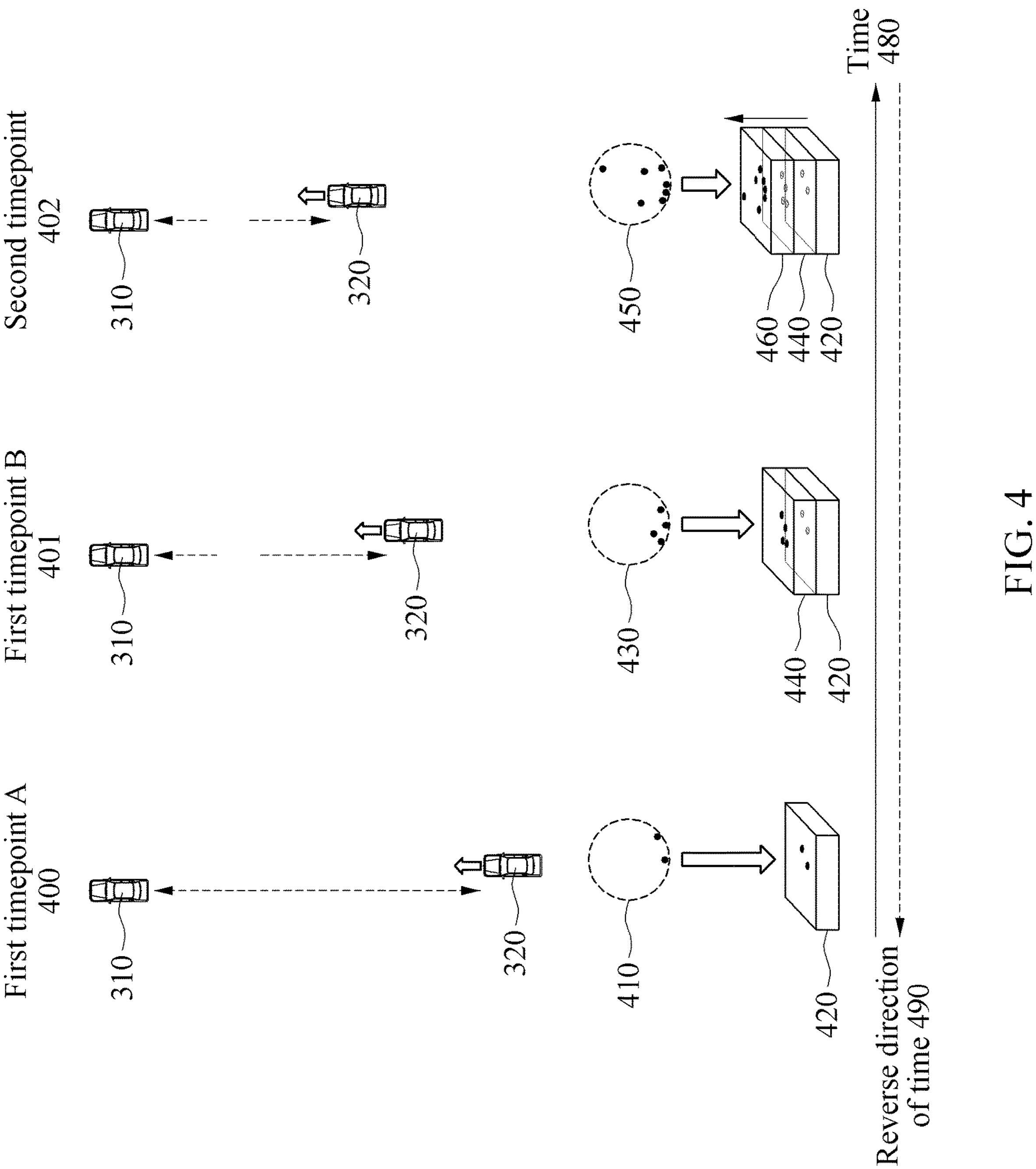
FIG. 4 illustrates an example of point cloud data accumulated over time according to one or more embodiments.

The processor 710 according to an example may store point clouds corresponding to a cluster in point cloud data for each of one or more first timepoints. Referring to FIG. 4, the processor 710 may store point clouds corresponding to a cluster from point cloud data 420 of a first timepoint A 400 and point cloud data 440 of a first timepoint B 401. When a cluster 450 corresponding to a target object is determined in point cloud data 460 of a second timepoint 402, the processor 710 may track point clouds corresponding to the cluster 450 from the point cloud data of one or more past timepoints (e.g., the first timepoint A 400 and first timepoint B 401). For example, based on the cluster 450 of the second timepoint 402, the processor 710 may track a cluster 430 of the first timepoint B 401 in point cloud data 440 of the first timepoint B 401. In addition, the processor 710 may store point clouds included in the cluster 430 of the first timepoint B 401. Based on the cluster 450 of the second timepoint 402, the processor 710 may track a cluster 410 of the first timepoint A 400 in point cloud data 420 of the first timepoint A 400. The processor 710 may store point clouds included in the cluster 410 of the first timepoint A 400.

The processor 710 according to an example may perform operation 182. In a non-limiting example, the processor 710 may generate training data based on point clouds for each cluster of one or more first timepoints and output data corresponding to these clusters on the basis of the result of tracking the cluster. For example, the processor 710 may generate training data in which stored point clouds are training input data and output data is ground truth data. Referring to FIG. 4, the point clouds included in the cluster 410 of the first timepoint A 400 and the point clouds included in the cluster 430 of the first timepoint B 401 may be training input data. Output data corresponding to each piece of the training input data may be output data corresponding to the cluster 450 of the second timepoint 402.

In a non-limiting example, the processor 710 may perform operation 190 after the training data is generated. Operation 190 may be for retraining the neural network and may be performed in real time when radar data is received. For example, training data may be generated whenever a target object is determined and thus operation 190 may be performed. The processor 710 according to an example may train the neural network based on the training data in which output data is ground truth data and at least some of point clouds for each cluster of the one or more first timepoints are training input data.

Figure 5:
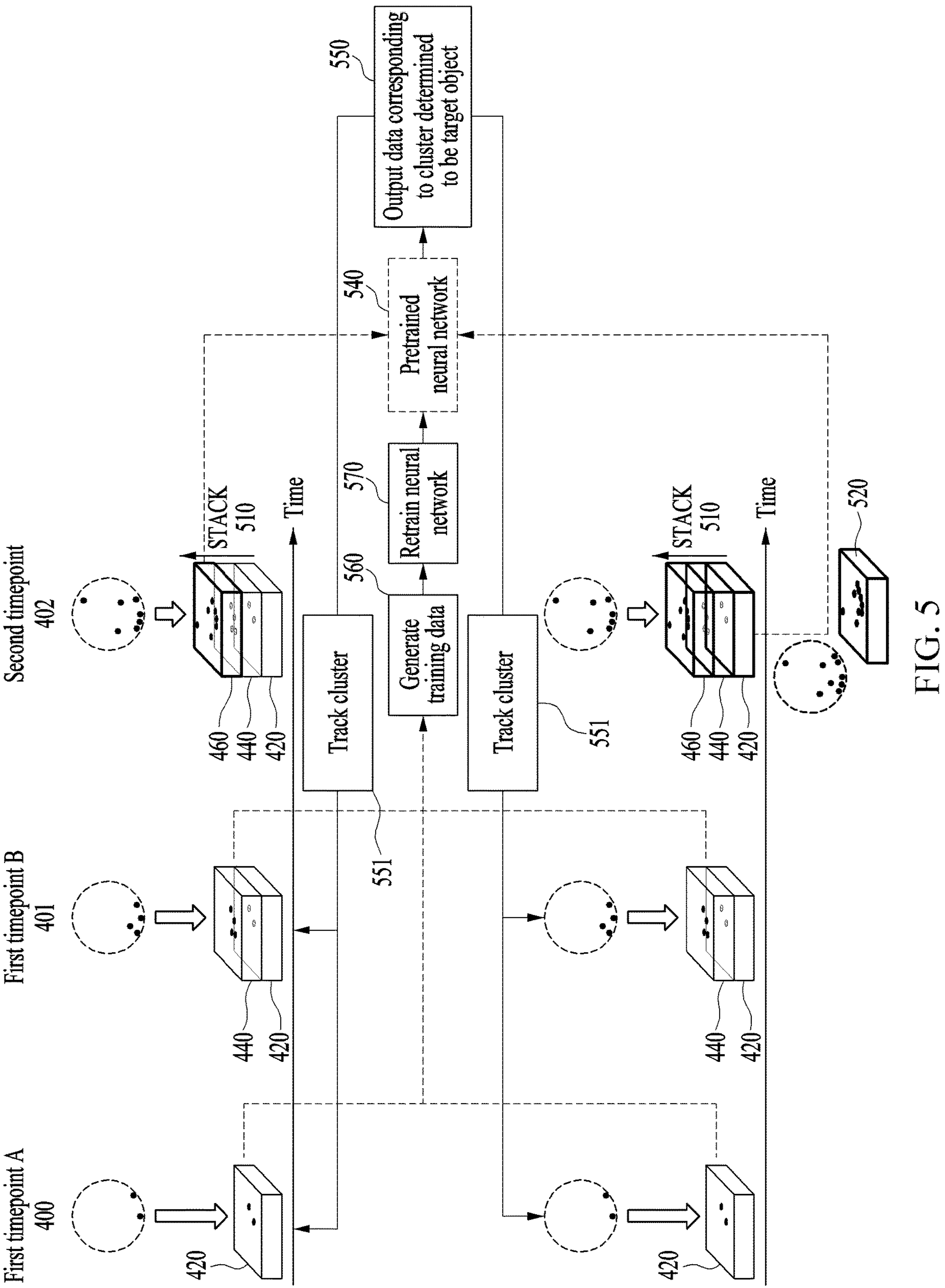
FIG. 5 illustrates an example of a method of retraining a neural network using point cloud data accumulated over time according to one or more embodiments.

Referring to FIG. 5, a method of training a neural network is described according to one or more embodiments.

In a non-limiting example, over time, point cloud data 420 of a first timepoint A 400, point cloud data 440 of a first timepoint B 401, and point cloud data 460 of a second timepoint 402 may be stored in a stack 510.

The processor 710 according to an example may apply, to a pretrained neural network 540, the point cloud data 460 (e.g., point clouds included in the point cloud data) of the second time point 402, which is the latest point cloud data. The processor 710 may obtain output data from the pretrained neural network 540. The processor 710 may determine some of one or more clusters as a target object based on the reliability of output data. Output data 550 corresponding to the cluster determined as the target object may be used as ground truth data in operation 570 of retraining the neural network. In operation 551, the processor 710 may track the cluster based on the output data 550. Based on the result of tracking the cluster, the processor 710 may identify point clouds corresponding to a cluster in each of the point cloud data 420 of the first timepoint A 400 and the point cloud data 440 of the first timepoint B 401. In operation 560, the processor 710 may generate training data based on the identified point clouds and the output data 550. Furthermore, in operation 570, the processor 710 may retrain the neural network based on the training data.

The processor 710 according to an example may apply accumulated point clouds 520 to the pretrained neural network 540. The accumulated point clouds 520 may include data obtained by merging point clouds of each cluster of one or more first timepoints into one time unit. For example, the accumulated point clouds 520 may be determined based on the point cloud data 420 of the first timepoint A 400, the point cloud data 440 of the first timepoint B 401, and the point cloud data 460 of the second timepoint 402. Since point clouds have two-dimensional (2D) coordinates representing positions, time-series data may be accumulated by positioning the 2D coordinates on one coordinate plane. The processor 710 may obtain output data from the pretrained neural network 540. The processor 710 may determine some of one or more clusters to be a target object based on the reliability of the output data 550. The output data 550 corresponding to the cluster determined to be the target object may be used as ground truth data in operation 570 of retraining the neural network. In operation 551, the processor 710 may track the cluster based on the output data 550. Based on the result of tracking the cluster, the processor 710 may identify point clouds corresponding to a cluster in each of the point cloud data 420 of the first timepoint A 400 and the point cloud data 440 of the first timepoint B 401. In operation 560, the processor 710 may generate training data based on the identified point clouds and the output data 550. Furthermore, in operation 570, the processor 710 may retrain the neural network based on the training data.

The processor 710 may store data determined to be the same target object (e.g., the same cluster) in the stack 510 in a chronological order. In addition, the processor 710 may utilize, as ground truth data, a result in which the reliability of an inference (e.g., output data) based on data stored in the stack 520 exceeds a threshold. Through this, the processor 710 may extract data stored in the stack 520 in a reverse chronological order and update the neural network.

Through this, the processor 710 may increase the accuracy of recognizing an object positioned at a long range from a driving vehicle by using radar data. In addition, the processor 710 may perform training of the neural network with respect to a distant object only by the driving vehicle. For example, a server may not need to operate in a plurality of vehicles synchronized with each other in order to recognize a distant object.

The processor 710 may detect an object beyond a range where the object may be detected based on the neural network pretrained only with LiDAR data. This is because past data with a low reliability (e.g., a distant object may be less likely to be recognized by the neural network) may be used for training the neural network, based on current data with a high reliability (e.g., the closer the range between a driving vehicle and an object, the greater the reliability of recognizing the object).

Figure 2:
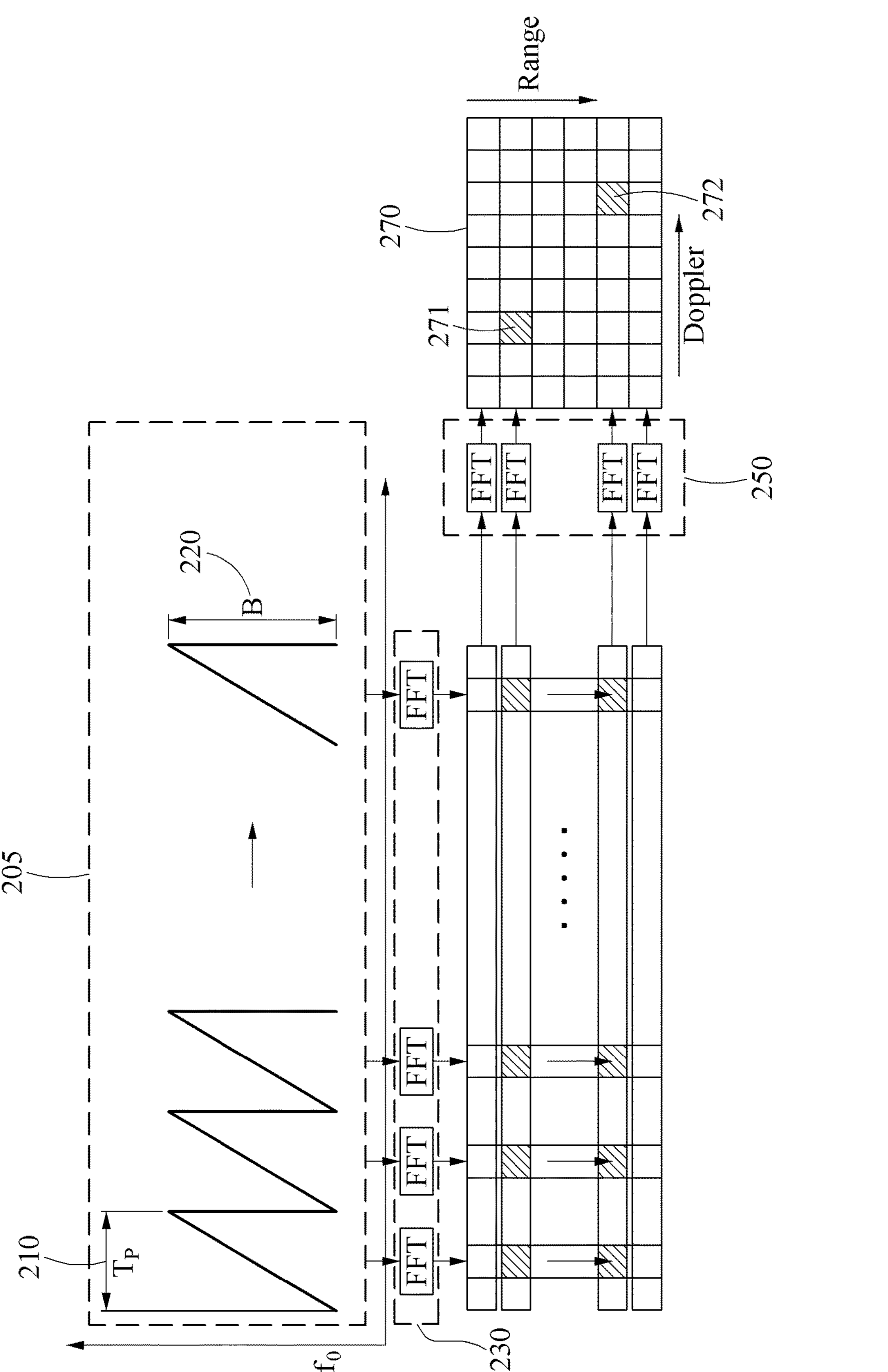
FIG. 2 illustrates an example of a method of calculating a range to a cloud point and a velocity of the cloud point according to one or more embodiments.

FIG. 2 illustrates an example of a method of calculating a range to a cloud point and a velocity of the cloud point according to one or more examples.

Referring to FIG. 2, a radar device may be, for example, a mmWave (e.g., a short-wavelength) radar and may measure a range to a target by analyzing a change in the waveform of a radar signal and a time of flight (ToF), which is a time until a radiated electric wave returns after being reflected by the target. For reference, compared to an optic-based sensor including a camera, the mmWave radar may detect front regardless of a change in an external environment, such as fog and rain. In addition, since the mmWave radar has excellent cost performance compared to LiDAR, the mmWave radar may be one of the sensors that may compensate for the aforementioned disadvantages of the camera.

For example, the radar device may be implemented as a frequency modulated continuous wave (FMCW) radar. The FMCW radar may be robust against external noise.

A chirp transmitter may generate a frequency modulated signal using frequency modulation models. For example, the chirp transmitter may generate a frequency modulated signal by alternately using different frequency modulation models. In this case, the frequency modulated signal may alternately include a chirp sequence signal interval according to a first frequency modulation model and a chirp sequence signal interval according to a second frequency modulation model. There may be a frequency difference by as much as a difference value between the chirp of the first frequency modulation model and the chirp of the second frequency modulation model. Such various chirp sequences of carrier frequencies may be used to extend the range of a maximum measurable Doppler velocity. The Doppler velocity may also be referred to as a radial velocity.

An array antenna may include a plurality of antenna elements. Multiple input multiple output (MIMO) may be implemented through the plurality of antenna elements. Here, a plurality of MIMO channels may be formed by the plurality of antenna elements. For example, a plurality of channels corresponding to M×N virtual antennas may be formed through M transmission antenna elements and N reception antenna elements. Here, radar reception signals received through the respective channels may have different phases based on reception directions.

Radar data may be generated based on the radar transmission signal and the radar reception signal. For example, the radar device may transmit the radar transmission signal through the array antenna based on the frequency modulation model. When the radar transmission signal is reflected by a target, the radar device may receive the radar reception signal through the array antenna. In addition, the radar device may generate an IF signal based on the radar transmission signal and the radar reception signal. The IF signal may have a frequency corresponding to a difference between the frequency of the radar transmission signal and the frequency of the radar reception signal. The processor 710 may perform a sampling operation on the IF signal and generate radar data through a sampling result.

The processor 710 may generate a range-Doppler map 270 by transforming a chirp sequence signal 205. For example, the processor 710 may perform an FFT on the chirp sequence signal 205. The processor 710 may perform a range FFT 230 on the chirp sequence signal 205. In addition, the processor 710 may perform a Doppler FFT 250 on the result of the range FFT 230. The processor 710 may generate the range-Doppler map 270 using at least one of the range FFT 230 and the Doppler FFT 250. In FIG. 2, $T_p$ 210 may be a chirp period and B 220 may be the total frequency deviation, e.g., the difference value, of a chirp sequence signal.

The processor 710 according to an example may detect at least one of points 271 and 272 from the range-Doppler map 270. For example, the processor 710 may detect the points 271 and 272 through CFAR with respect to the range-Doppler map 270.

Figure 3:
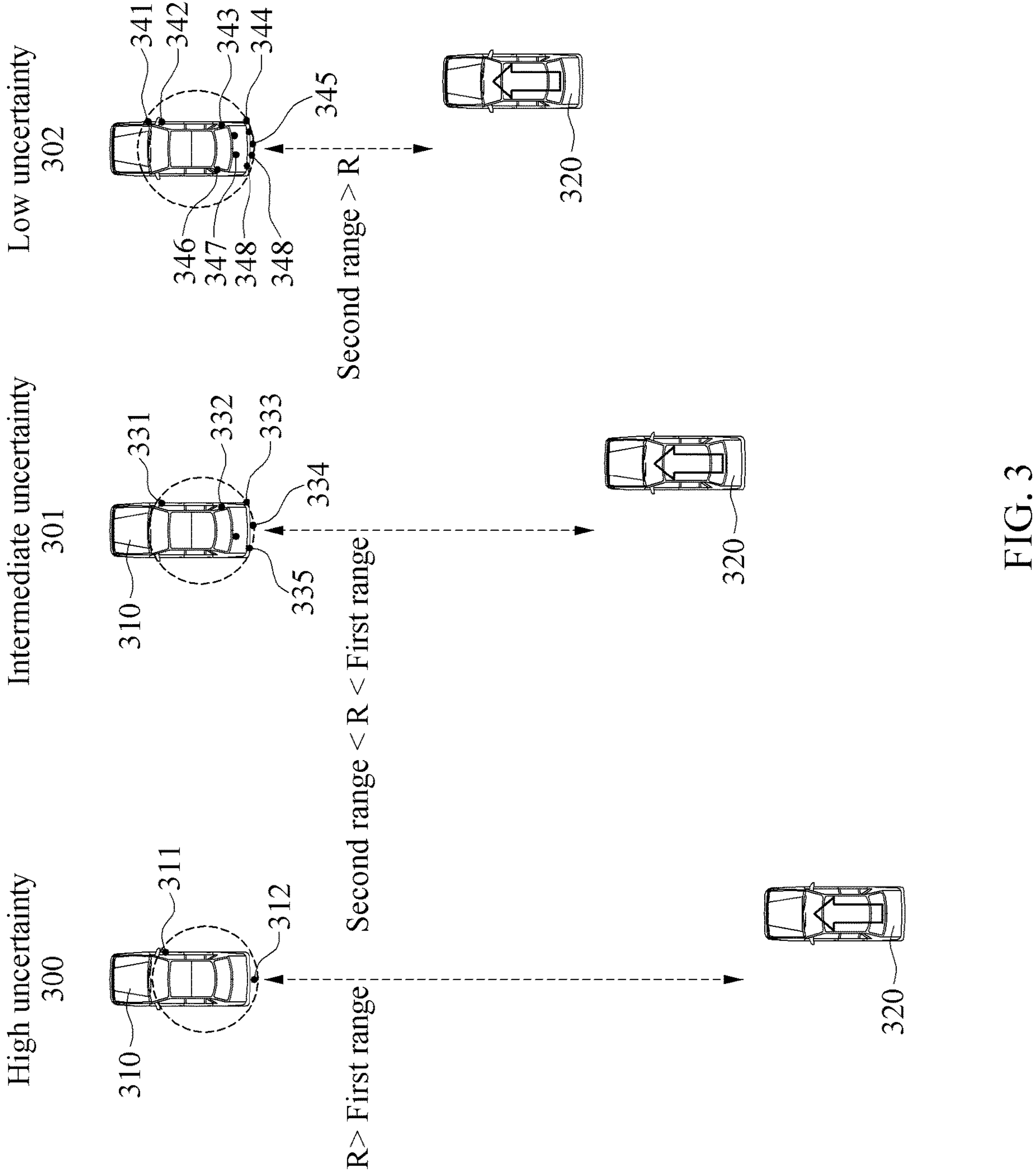
FIG. 3 illustrates an example of a point cloud according to a range between a driving vehicle and a target object according to one or more embodiments.

FIG. 3 illustrates an example of a point cloud according to a range between a driving vehicle and a target object according to one or more embodiments.

In a non-limiting example, a high uncertainty 300 may refer to a long range between a driving vehicle 320 and an object 310. When the range between the driving vehicle 320 and the object 310 is expressed as R and the reference range of a long range is a first range, an uncertainty may be high in the case of R>the first range. In this case, the point clouds 311 and 312 which correspond to the object 310 illustrate that a number of point clouds in a long range case may be small. The smaller the number of point clouds, the harder it may be to identify the object. For example, the processor 710 may apply the point clouds 311 and 312 to a neural network and obtain output data of which reliability does not satisfy a predetermined criterion.

In a non-limiting example, an intermediate uncertainty 301 may be a case in which a range between the driving vehicle 320 and the object 310 is moderate. The uncertainty may be intermediate in the case of a second range being of a moderate distance, e.g., the second range<R<the first range. In this case, there are point clouds 331, 332, 333, 334, and 335 which correspond to the object 310 are illustrated an example of being more numerous than the long range case and the number of point clouds in this moderate case may be greater than that of the high range case. Thus, the intermediate uncertainty 301 is less than the high uncertainty 300. In an example where the range between the driving vehicle 320 and the object 310 becomes closer, there may be a greater number of point clouds corresponding to the object 310. The greater the number of point clouds, the greater the accuracy of detecting an object. For example, the processor 710 may apply the point clouds 331, 332, 333, 334, and 335 to the neural network and thus obtain output data of which the reliability does not satisfy the predetermined criterion.

In a non-limiting example, a low uncertainty 302 may be a case where a range between the driving vehicle 320 and the object 310 is short. The second range>R may refer to the low uncertainty. In this case, the number of point clouds 341, 342, 343, 344, 345, 346, 347, 348, and 349 corresponding to the object 310 may be greater than the number of point clouds found in the second range illustrated for intermediate uncertainty 301. The closer the range between the driving vehicle 320 and the object 310, the greater the number of point clouds corresponding to the object 310. The greater the number of point clouds, the greater accuracy of recognizing an object. The low uncertainty 302 may be a range close enough to identify an object. The processor 710 may apply the point clouds 341, 342, 343, 344, 345, 346, 347, 348, and 349 to the neural network and thus obtain output data of which the reliability meets the predetermined criterion.

FIG. 4 illustrates an example of point cloud data accumulated over time according to one or more embodiments.

According to time 480, point cloud data may accumulate. For example, point cloud data 420 of a first time point A 400 may be generated based on radar data measured by a radar device of a driving vehicle 320 at the first timepoint A 400. Point cloud data 440 of a first timepoint B 401 may be generated based on radar data measured by a radar device of the driving vehicle 320 at the first timepoint B 401, which is the next timepoint of the first timepoint A 400. Point cloud data 460 of a second timepoint 402 may be generated based on radar data measured by the radar device of the driving vehicle 320 at the second timepoint 402 following the first timepoint B 401.

The processor 710 according to an example may accumulate and store point cloud data generated over time. Furthermore, the processor 710 may track a cluster corresponding to a target object in the accumulated point cloud data in a reverse direction 490 of time. For example, the processor 710 may track a cluster in the point cloud data 440 of the first timepoint B 401 to identify point clouds included in the cluster and then track the cluster in the point cloud data 420 of the first timepoint A 400.

FIG. 6 illustrates an example of a second coordinate system according to one or more embodiments.

A second coordinate system 601 according to an example may include an x-axis 620, a y-axis 630, and a z-axis 640. The x-axis 620 and the y-axis 630 may indicate the position of a driving vehicle 650 and the position of each point cloud of an object near the driving vehicle 650. The z-axis 640 may represent a velocity.

In a non-limiting example, a driving vehicle 650 may be moving in a driving direction 660. In this case, the coordinates of the y-axis 630 of the driving vehicle 650 may change over time. As the driving vehicle 650 moves, an object around the driving vehicle 650 may also change. For example, as displayed in a camera image 600, an object 610 (e.g., a vehicle) may be on the left side of the driving vehicle 650. In an example, the camera image 600 may be displayed on a display device, such as display device 750 described below in greater detail with reference to FIG. 7. When the object 610 exists, point clouds of the object 610 may be displayed as an area 611 on the second coordinate system 601. The point clouds in the area 611 may be points in one cluster generated as a result of clustering point clouds. As the driving vehicle 650 moves in the driving direction 660, the object 610 may come closer to the driving vehicle 650. As the driving vehicle 650 moves in the driving direction 660, the area 611 (or a cluster) corresponding to the object 610 in the second coordinate system 601 may get closer to the driving vehicle 650. For example, a difference between the y-axis coordinates of the driving vehicle 650 and the y-axis coordinates of the point clouds in the area 611 may become smaller.

The processor 710 may transform a first coordinate system into the second coordinate system by using information about a driving vehicle. As shown in the second coordinate system 601 of FIG. 6, the second coordinate system generated using information about the driving vehicle 650 may display at least one of the position, the driving direction 660, and the velocity of the driving vehicle 650. The processor 710 according to another example may transform the first coordinate system into the second coordinate system without using the information about the driving vehicle 650. In this case, the information about the driving vehicle 650 may not be displayed on the second coordinate system 601.

Figure 7:
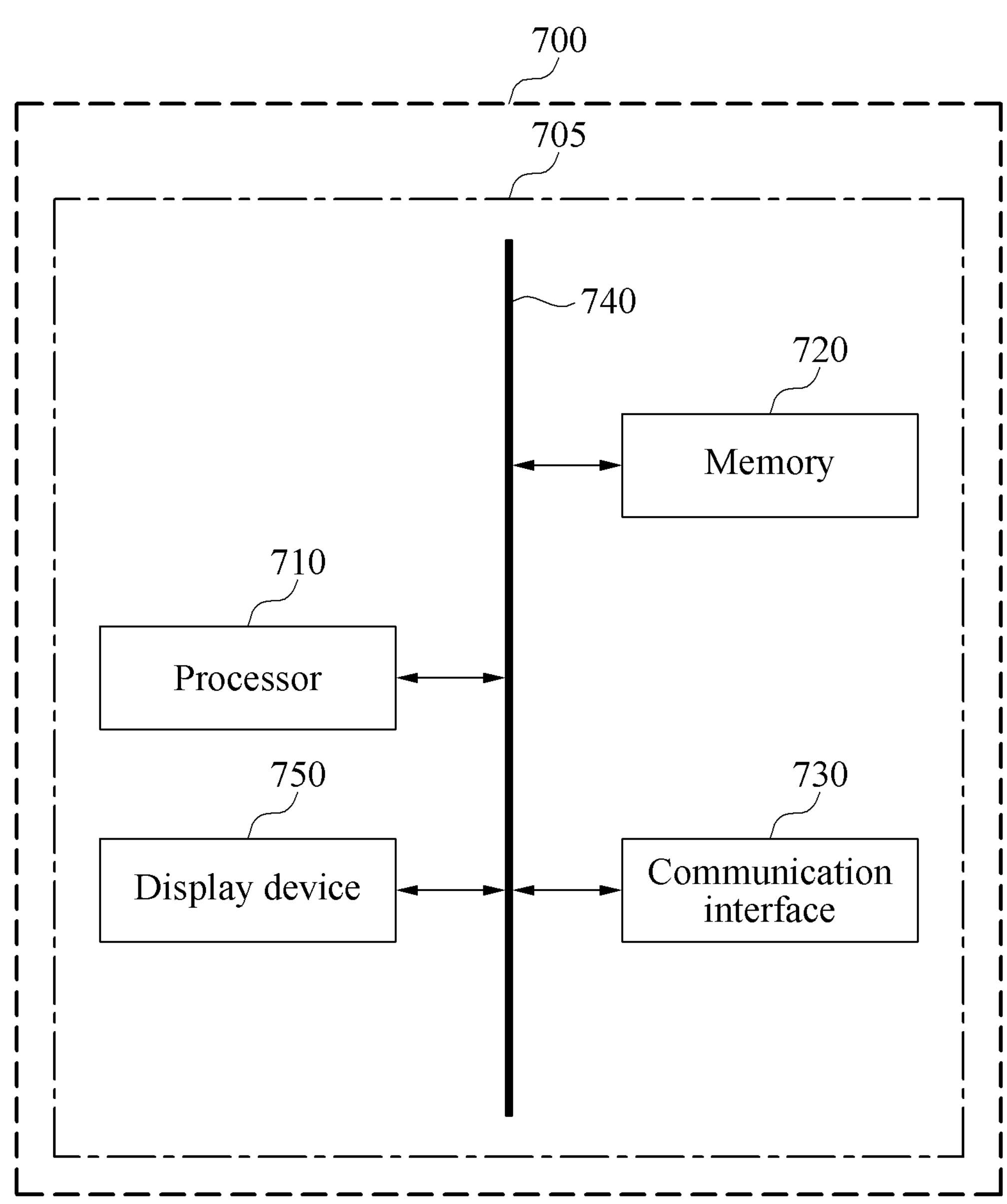
FIG. 7 illustrates an example of an electronic device according to one or more embodiments.

FIG. 7 illustrates an example of an electronic device provided in a vehicle according to one or more embodiments.

Referring to FIG. 7, in a non-limiting example, a vehicle 700 may be or include an electronic device 705, the electronic device 705 may include a processor 710, a memory 720, a communication interface 730, and a display device 740, for example. The processor 710, the memory 720, and the communication interface 730 may be connected to each other via a communication bus 740.

Various examples of vehicle 700 embodiments exist, including all types of mechanized transportation, such as traveling on a road, track, or other surfaces. The vehicle 700 may be, for example, an automobile, a motorcycle, a bicycle, and the like, and the automobile may be any one of various types, such as a passenger car, a freight vehicle, and a two-wheeled vehicle. The vehicle 700 may be an autonomous vehicle, an intelligent vehicle, and a vehicle equipped with a driving assistance system. The vehicle 700 described herein may be a vehicle in which an electronic device 705 is provided, but is not limited thereto. In one or more examples, the electronic device 705 may be such a driving system. The vehicle 700 may also be referred to as the electronic device 705, and thus, the electronic device 705 may include various additional components of the vehicle 700.

The electronic device 705 according to an example may further include the aforementioned radar device. Accordingly, the processor 710 may process radar data received from the radar device and store the processed radar data in the memory 720. The electronic device 705 according to an example may control the driving of the driving vehicle. The electronic device 705 may control the driving vehicle based on the movement of a cut-in object.

The memory 720 may include computer-readable instructions. The processor 710 may be configured to execute computer-readable instructions, such as those stored in the memory 720, and through execution of the computer-readable instructions, the processor 710 is configured to perform one or more, or any combination, of the operations and/or methods described herein. The memory 720 may be a volatile or nonvolatile memory.

The processor 710 may further execute programs, and/or may control the electronic device 705 and operations of the vehicle 700, and may include any one or a combination of two or more of, for example, a central processing unit (CPU), a graphic processing unit (GPU), a neural processing unit (NPU) and tensor processing units (TPUs), but is not limited to the above-described examples. The processor 700 may also be representative of one or more electronic control units (ECUs).

The display device 750 may be implemented using a liquid crystal display (LCD), a light-emitting diode (LED) display, a plasma display panel (PDP), a screen, a terminal, or any other type of display configured to display the images and information to be displayed by the image display apparatus. A screen may be a physical structure that includes one or more hardware components that provide the ability to render a user interface and receive user input. The screen may include any combination of a display region, a gesture capture region, a touch-sensitive display, and a configurable area. The screen may be part of an apparatus, or may be an external peripheral device that is attachable to and detachable from the apparatus. The display may be a single-screen display or a multi-screen display. A single physical screen may include multiple displays that are managed as separate logical displays permitting different content to be displayed on separate displays even though they are part of the same physical screen.

The communication interface 730 may include user interface may provide the capability of inputting and outputting information regarding a user and an image. The user interface may include a network module for connecting to a network and a universal serial bus (USB) host module for forming a data transfer channel with a mobile storage medium. In addition, the user interface may include one or more input/output devices, such as the display device 750, a mouse, a keyboard, a speaker, or a software module for controlling the input/output device.

In an example, information regarding the ADAS may be communicated to a driver of the vehicle 700 and allow the driver, or passenger, to control the ADAS through the communication interface 730.

The electronic devices, processors, memories, vehicles, neural networks, processor 710, memory 720, communication interface 730, communication bus 730, and display device 750 described herein and disclosed herein described with respect to FIGS. 1-7 are implemented by or representative of hardware components. As described above, or in addition to the descriptions above, examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. As described above, or in addition to the descriptions above, example hardware components may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-7 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media, and thus, not a signal per se. As described above, or in addition to the descriptions above, examples of a non-transitory computer-readable storage medium include one or more of any of read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and/or any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above and all drawing disclosures, the scope of the disclosure is also inclusive of the claims and their equivalents, i.e., all variations within the scope of the claims and their equivalents are to be construed as being included in the disclosure.

What is claimed is:

1. A processor-implemented method, the method comprising:

clustering second point clouds comprised in second point cloud data of a second timepoint;

obtaining output data corresponding to one or more second clusters generated as a result of the clustering by applying the second point clouds to a pretrained neural network;

setting, dependent on whether a reliability factor corresponding to the output data satisfying a predetermined criterion, at least one or more second clusters to be a target object, wherein the reliability factor is determined based on at least one of a determined uncertainty score and a determined confidence score, and wherein the setting of the one or more second clusters as the target object comprises:

based on the determined uncertainty score of the output data corresponding to the at least one of the one or more second clusters being less than or equal to a predetermined first criterion, assigning a respective cluster to be the target object based on the determined uncertainty score; and based on the determined confidence score of the output data corresponding to the cluster being greater than or equal to a predetermined second criterion, assigning the respective cluster to be the target object based on the determined confidence score;

tracking first clusters corresponding to the target object in first point cloud data of one or more first timepoints, the first timepoints being timepoints prior to the second timepoint; and retraining the pretrained neural network based on the output data corresponding to the first clusters and the first point clouds for each first cluster determined according to a result of the tracking, wherein the first point cloud data and second point cloud data respectively comprise data generated by transforming a four-dimensional (4D) first coordinate system, having a range, a velocity, and an angle of arrival as axes, into a second coordinate system.

2. The method of claim 1, wherein the first point cloud data and second point cloud data respectively comprise data generated based on radar data received from a radar device attached to a driving vehicle.

3. The method of claim 1, wherein the first coordinate system comprises a coordinate system generated based on at least one of the range obtained from radar data through a range Fast Fourier Transform (FFT), the velocity obtained from the radar data through a Doppler FFT, and the angle of arrival obtained from the radar data.

4. The method of claim 1, wherein the four-dimensional (4D) second coordinate system comprises two or three axes indicating a position and one axis indicating a velocity, and wherein the second coordinate system comprises an absolute coordinate system capable of displaying a position of a driving vehicle and a position of an object.

5. The method of claim 1, wherein the clustering of the second point clouds comprises clustering the second point clouds based on a density degree of the point clouds in the second point cloud data.

6. The method of claim 1, wherein the pretrained neural network is a neural network trained to recognize at least one target object positioned within a predetermined range from a driving vehicle, and wherein data input to the pretrained neural network comprises point clouds.

7. The method of claim 1, wherein the pretrained neural network comprises at least one of a first neural network pretrained based on radar data and a second neural network pretrained based on at least one of Light Detection and Ranging (LiDAR) data or third sensor data.

8. The method of claim 1, wherein the output data comprises at least one of a type, a position, a size, and a movement direction of an object corresponding to each of the first clusters.

9. The method of claim 1, wherein the tracking of the first clusters comprises tracking a target cluster corresponding to the target object in a second coordinate system based on information about a vehicle to which a radar device is attached.

10. The method of claim 1, wherein the tracking of the first clusters comprises tracking a target cluster corresponding to the target object on a premise that the target object is fixed in a second coordinate system.

11. The method of claim 1, wherein the tracking of the first clusters comprises tracking a target cluster corresponding to the target object based on a comparison between state information corresponding to a second cluster of the one or more second clusters, the state information being predicted based on state information corresponding to the target cluster in the first point cloud data of the first timepoint, and state information corresponding to the second cluster in the second point cloud data.

12. The method of claim 1, wherein the tracking of the first clusters comprises storing point clouds corresponding to a target cluster corresponding to the target object in the point cloud data of each of the one or more first timepoints.

13. The method of claim 1, wherein the retraining of the pretrained neural network comprises training the pretrained neural network based on training data including ground truth data and respective one or more point clouds for target clusters corresponding to target objects of the one or more first timepoints.

14. The method of claim 13, wherein the one or more first timepoints include plural timepoints, and wherein the first point clouds comprise data obtained by merging the first point clouds for each first cluster into one time unit.

15. An electronic device, comprising:

at least one processor; and a radar, wherein the processor is configured to:

cluster second point clouds comprised in second point cloud data of a second timepoint;

obtain output data corresponding to one or more second clusters generated as a result of the clustering by applying the second point clouds to a pretrained neural network;

set one or more of the second clusters as a target object based on whether a reliability factor corresponding to the output data satisfies a predetermined criterion2 wherein the setting of the one or more second clusters as the target object comprises:

based on the determined uncertainty score of the output data corresponding to the at least one of the one or more second clusters being less than or equal to a predetermined first criterion, assigning a respective cluster to be the target object based on the determined uncertainty score; and based on the determined confidence score of the output data corresponding to the cluster being greater than or equal to a predetermined second criterion, assigning the respective cluster to be the target object based on the determined confidence score;

track a first cluster corresponding to the target object in respective first point cloud data of one or more first timepoints, the first timepoints being one or more timepoints prior to the second timepoint; and retrain the pretrained neural network based on the output data corresponding to the first cluster and first point clouds for each first cluster determined according to a result of the tracking, wherein the first point cloud data and second point cloud data respectively comprise data generated by transforming a four-dimensional (4D) first coordinate system, having a range, a velocity, and an angle of arrival as axes, into a second coordinate system.

16. A server, comprising:

a processor configured to execute a plurality of instructions; and a memory storing the plurality of instructions, wherein execution of the plurality of instructions configures the processor to be configured to:

cluster second point clouds comprised in second point cloud data of a second timepoint;

obtain output data corresponding to one or more second clusters generated as a result of the clustering by applying the second point clouds to a pretrained neural network;

set at least one of the one or more second clusters to be a target object based on whether a reliability factor corresponding to the output data satisfies a predetermined criterion, wherein the setting of the one or more second clusters as the target object comprises:

based on the determined uncertainty score of the output data corresponding to the at least one of the one or more second clusters being less than or equal to a predetermined first criterion, assigning a respective cluster to be the target object based on the determined uncertainty score; and based on the determined confidence score of the output data corresponding to the cluster being greater than or equal to a predetermined second criterion, assigning the respective cluster to be the target object based on the determined confidence score;

track a first cluster corresponding to the target object in first point cloud data of one or more first timepoints, the first timepoints being timepoints prior to the second timepoint; and retrain the pretrained neural network based on the output data corresponding to the second cluster and first point clouds for each first cluster determined according to a result of the tracking, wherein the first point cloud data and second point cloud data respectively comprise data generated by transforming a four-dimensional (4D) first coordinate system, having a range, a velocity, and an angle of arrival as axes, into a second coordinate system.

17. A device, comprising:

a processor configured to execute a plurality of instructions; and a memory storing the plurality of instructions, wherein execution of the plurality of instructions configures the processor to be configured to:

detect, at a second time point, a target object among second point cloud data according to a density degree of second point clouds in the second point cloud data;

classify the target object into a type of object by applying a target point cloud of the second point cloud including the target object to a trained neural network;

set at least one of the one or more second clusters to be a target object based on whether a reliability factor corresponding to the output data satisfies a predetermined criterion, wherein the setting of the one or more second clusters as the target object comprises:

based on the determined uncertainty score of the output data corresponding to the at least one of the one or more second clusters being less than or equal to a predetermined first criterion, assigning a respective cluster to be the target object based on the determined uncertainty score; and based on the determined confidence score of the output data corresponding to the cluster being greater than or equal to a predetermined second criterion, assigning the respective cluster to be the target object based on the determined confidence score:

track the target object among first point clouds in first point cloud data from a plurality of previous time-points; and retrain the pretrained neural network based on the second point cloud data and first point clouds for each first cluster according to a result of the tracking, wherein the first point cloud data and second point cloud data respectively comprise data generated by transforming a four-dimensional (4D) first coordinate system, having a range, a velocity, and an angle of arrival as axes, into a second coordinate system.

* * * * *